UNITED STATES PATENT OFFICE.

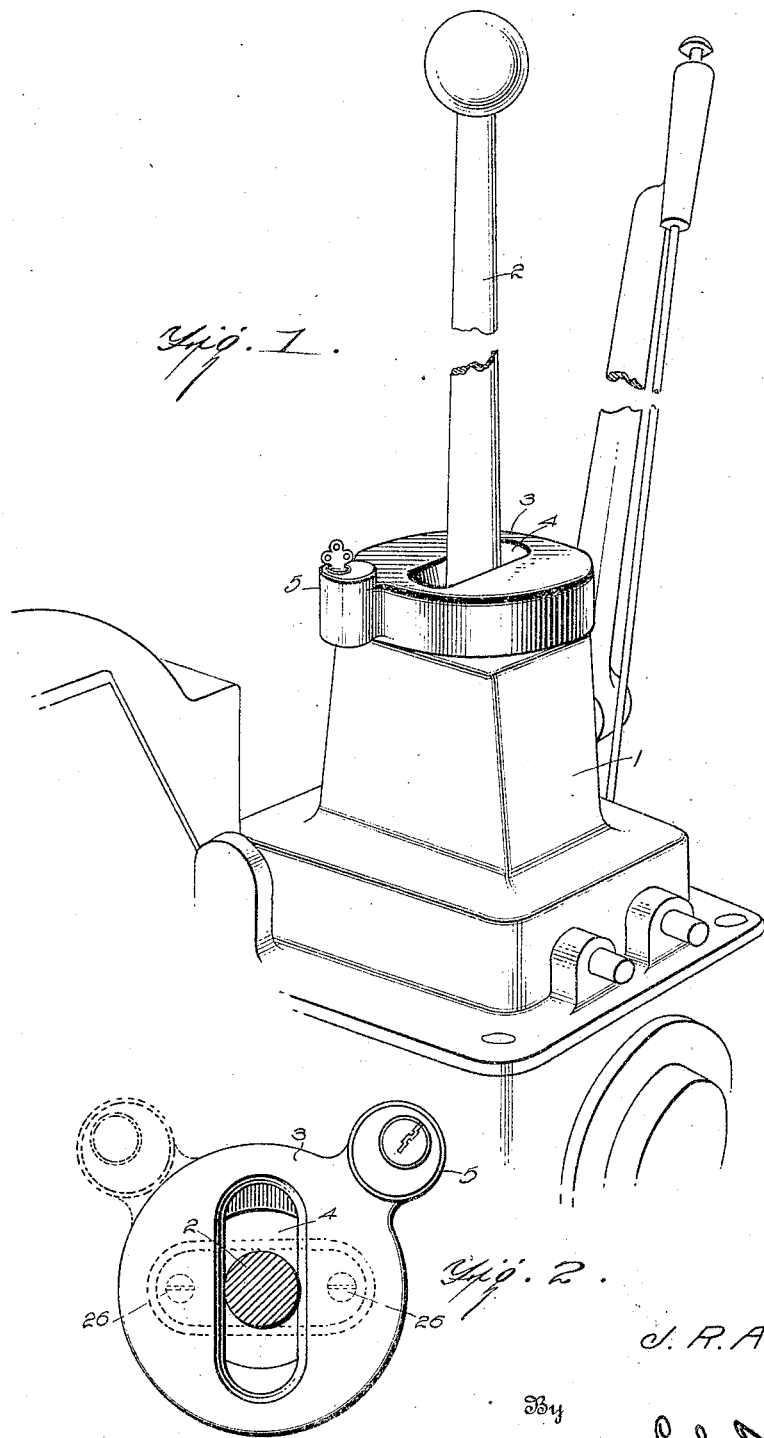

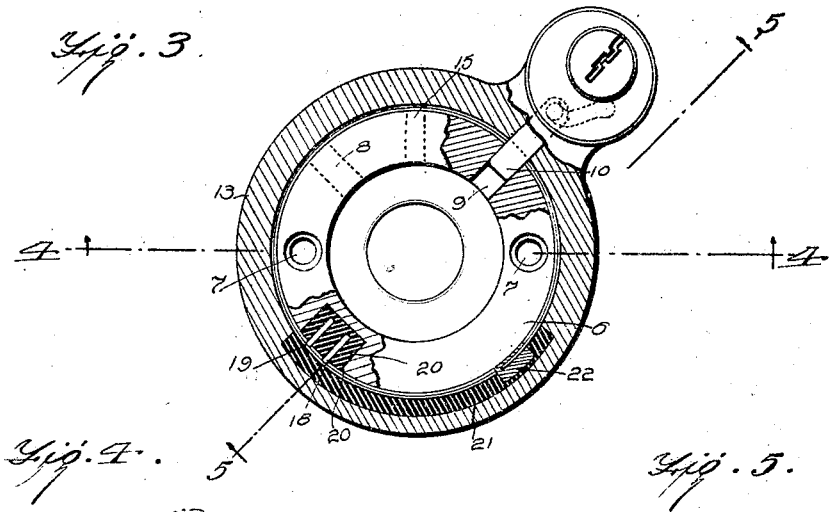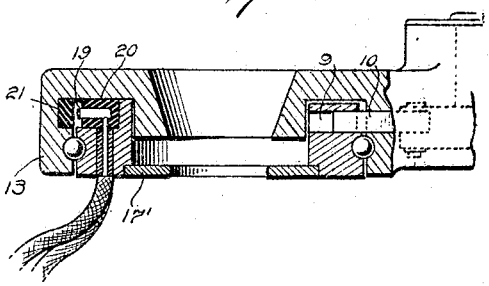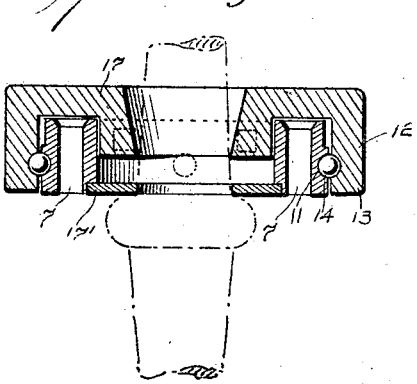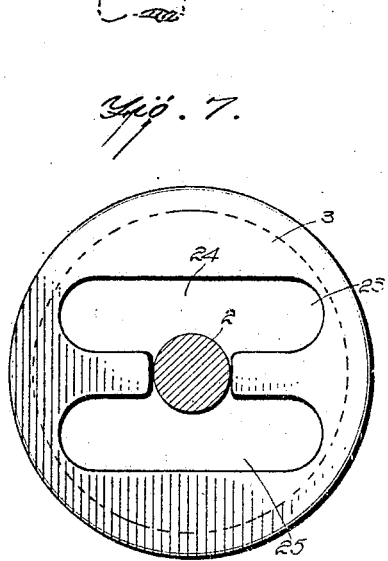

JAMES R. ADAMS, OF ROANOKE, VIRGINIA.

LOCK FOR MOTOR-VEHICLES.

1,378,308.     Specification of Letters Patent.     Patented May 17, 1921.

Application filed April 3, 1920. Serial No. 371,077.

*To all whom it may concern:*

Be it known that I, JAMES R. ADAMS, a citizen of the United States, residing at Roanoke, in the county of Roanoke and State of Virginia, have invented certain new and useful Improvements in Locks for Motor-Vehicles, of which the following is a specification.

This invention relates to locks for motor vehicles, and it comprises a rotatable cap adapted to be secured to the transmission housing of a vehicle and to embrace the gear shift lever to permit rotation of said cap, the face of the cap being provided with a slot shaped to permit manipulation of the lever when the cap is in one position, and to prevent manipulation thereof when the cap is in a second position and means for locking said cap in either position; and it further comprises the combination with said means to prevent the manipulation of the gear shift lever of circuit breaking means comprising a pair of spaced contacts arranged on a stationary plate and connected to the ignition circuit of the vehicle, and a contact member carried by said rotating cap and adapted to close said ignition circuit when the cap is in operative position and to break said circuit when the cap is in inoperative position, all as more full hereinafter set forth and as claimed.

Various types of locks have been devised to prevent unauthorized use of motor vehicles. In some instances, these mechanisms are applied to the brake to lock the brake when the machine is not in use, and in other instances, they are applied to the steering wheel to prevent turning of the steering wheel. In most cities, however, there are city laws and ordinances which prohibit locking a machine so that it cannot be moved in case of fire or other trouble wherein it is necessary to clear certain streets.

The provision of locking means for the gear shift lever whereby the car may be locked in neutral position so that it may be pushed from the scene of fire, but not driven, is the accepted type of locking mechanism for motor vehicles. However, such devices generally consist of a locking plate that embraces the gear shift lever when in operative position and is moved entirely clear of the gear shift lever when in inoperative position. These locking plates are generally hinged to a second plate attached to the floor of the machine, and the lock may be readily broken by breaking the hinge connecting the two sections.

In the present invention, I have devised a lock for the gear shift lever of a motor vehicle which comprises a cap rotatably mounted around the gear shift lever and immovably secured to a second plate, or to a portion of the transmission housing. The rotating cap is provided with an elongated opening which will permit operation of the gear shift lever when the cap is in one position and prevent operation thereof when the cap is in a second position. Means are provided for locking the cap in either of said positions.

The present invention further comprises a combination with the rotatable locking cap, of a circuit breaking means to break the ignition circuit when the cap is in an inoperative position. A pair of spaced contacts connected to the ignition circuit is arranged upon the stationary plate secured to the transmission housing, or to the transmission housing, and rotating cap is provided with a contact adapted to bridge said spaced contacts when the rotating cap is in an operative position and to be moved from such bridging position when the rotating cap is in an inoperative position.

In the accompanying drawings, I have shown several advantageous embodiments of this invention. In this showing, Figure 1 is a perspective view of the transmission housing of a motor vehicle showing the locking device applied to the gear shift lever, Fig. 2 is a plan view of the locking device in an operative position, Fig. 3 is a horizontal sectional view of a modified form, showing the circuit breaking means, Fig. 4 is a vertical sectional view on the line 4—4 of Fig. 3, Fig. 5 is a similar view on the line 5—5 of Fig. 3, Fig. 6 is a perspective view of the plate or plug secured to the housing, and, Fig. 7 is a plan view of the rotating cap showing a modified form of slot.

Referring to Figs. 1 and 2 of the drawings, the reference numeral 1 designates generally, the transmission housing of a motor vehicle, provided with an operating or gear shift lever 2. The gear shift lever is of the usual construction and when the lever is in a central position, the transmission gearing is disconnected or in neutral position. The various speeds are obtained by moving the gear shift lever to each side and forward or backward.

As shown in this form of the invention, a cap 3 is rotatably mounted on the gear shift lever. This cap is provided with means to prevent its removal from the gear shift lever and at the same time permit rotation. The cap is provided with an elongated slot 4 in its upper face through which the gear shift lever projects. A lock 5 of ordinary construction is arranged on the cap and is adapted to lock it in either of two positions, to permit manipulation of the gear shift lever or to prevent manipulation of the gear shift lever. As shown in Fig. 1 of the drawings, the gear shift lever is incapable of operation with the locking device in the position shown. The major axis of the slot is arranged transversely of the lever and while the lever may be moved to either side, it cannot be moved forwardly or rearwardly sufficient to connect the different speeds of gearing. When the cap is in the position shown in Fig. 2 of the drawings, the gear shift lever is in operative position. As shown, the minor axis of the slot is arranged transversely of the lever. In this position, the lever may be moved slightly to one side on its pivot and then forwardly or rearwardly to connect the different speeds.

Referring to Figs. 3 to 6 of the drawings, in these figures, I have shown a slightly modified type of rotating cap and have also illustrated the circuit breaking means which are not shown in Figs. 1 and 2. In this form, I have shown a core 6, which is arranged on the transmission housing and receives the rotating cap. When the device is sold as an attachment for motor vehicles, the core 6 is provided, and it is secured to the transmission housing by suitable fastening means, such as screws or bolts. Openings 7 are arranged in the cap for the reception of these fastening means. When the device is built as a part of a motor vehicle in construction, the core 6 may be formed integral with the transmission housing. As shown, the core is provided with a pair of radial slots 8 and 9 for the reception of the locking bolt 10 of lock 5, whereby the cap is locked in either operative or inoperative position. The plate is provided with a circumferential groove 11 upon its outer periphery and the flange 12 of the cap is provided with a registering groove 13 on its inner face. These grooves are adapted to receive ball bearings 14, whereby the cap is locked on the plate to prevent removal, but permit rotation. The ball bearings may be inserted in the grooves through a slot 15 in the core 6 or in any other suitable manner. After the balls have been inserted, the end of the slot 15 may be closed in any suitable manner to prevent removal.

In place of the construction just described, other constructions may be employed to produce the same result. The plate may be provided with a circumferential groove, as shown, and the cap may be provided with one or more projecting lugs adapted to enter the groove. As shown in Figs. 3 to 5 of the drawings, the rotating cap is provided with a flange 17, projecting into the space in the center of the plate or core.

The opening in the cap in this instance is made substantially circular, and when the locking bolt 10 is retracted, the cap is revolved by the pressure of the gear shift lever. The slot 8 is not provided with this type of cap and the cap is locked only when in inoperative position. When the elliptical slot shown in Figs. 1 and 2 is employed, or the slot shown in Fig. 7, to be described, the cap is locked in either position, and the slot 8 is shown in Fig. 3 for the purpose of illustration. A plate 17' is arranged beneath the core of the locking device and engages the lever to hold it in position.

The circuit breaking means forming a part of the present invention are also shown in Figs. 3 to 6 of the drawings. As shown, a pair of spaced contacts 18 and 19 are arranged on the stationary plate, mounted in an insulating block 20. These two contacts are connected in the ignition circuit so that the circuit will be open when the contacts are not bridged. An insulating block 21 is mounted in the rotating cap and a contact plate 22 is arranged therein. When the rotating cap is in operative position, to permit manipulation of the gear shift lever, the contact plate 22 bridges the contacts 18 and 19, closing the circuit; but when the device is in inoperative position, as shown in Fig. 3 of the drawings, the contact plate is moved from this bridging position, opening the ignition circuit. When the lock is provided with this means for breaking the ignition circuit, it dispenses with the necessity of a lock switch on the dash board of the machine. The machine is provided with the usual ignition button for opening and closing the circuit, but the present locking mechanism takes the place of key operated switch by means of which the vehicle is locked when not in use.

In Fig. 7 of the drawings, I have shown a plan view of the rotating cap provided with a modified form of slot. As shown, the slot 23 is substantially H-shaped. When the cap is in the position shown in Fig. 7, the gear shift lever is in inoperative position, as it cannot be moved to either side to connect the different speeds. When the cap is turned one quarter of a revolution, the legs 24 and 25 of the slot are arranged on each side of the lever and the lever may be moved first to either side and then either forwardly or rearwardly to an operative position.

Referring to Fig. 2 of the drawings, the screws 26 which are received in the holes 7 of the stationary plate to secure the plate to the transmission housing are shown in dotted lines. When the device is in an inoperative position, as shown in this figure, the screws are covered by the cap 3, but when the cap is turned a quarter of a revolution, the screws are uncovered and they may be removed for disassembling the lock.

The operation of the device is readily apparent. When the driver of the machine leaves it, the rotating cap is revolved to inoperative position and the locking bolt 10 enters the slot 9. It is then impossible to operate the machine without first rotating the cap and it is necessary to have a key fitting the lock 5 before this can be accomplished. When the machine is to be operated by the proper person, a key is inserted in lock 5, the bolt 10 is withdrawn from the slot 9, and the cap revolved to an operative position. In the forms shown in Figs. 1, 2 and 7, the bolt 10 then enters slot 8, locking the device in operative position. When the opening in the cap is of the form shown in Figs. 3 to 5, the cap is not locked in operative position, but is merely left free to revolve and permit operation of the lever.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

What I claim is:

1. The combination with a locking device for vehicles comprising a rotatable member surrounding the gear shift lever of a motor vehicle, said member being adapted to prevent manipulation of the gear shift lever when in one position, of circuit breaking means comprising a pair of spaced contacts arranged in the ignition circuit, a contact carried by said rotatable member adapted to bridge said spaced contacts when the rotatable member is in one position and to break the ignition circuit when the rotatable member is in another position, and means for securing said rotatable member in either position.

2. A locking device for motor vehicles comprising a cap rotatably mounted on the gear shift lever, said cap being provided with an elongated slot, a stationary plate arranged within said cap, means for locking said cap to said plate, said plate and said cap being provided with registering grooves, and locking means arranged in said grooves to prevent removal of said cap.

3. The combination with a locking device for vehicles comprising a rotatable member surrounding the gear shift lever of a motor vehicle, said member being adapted to prevent manipulation of the gear shift lever when in one position, of circuit breaking means comprising a pair of spaced contacts arranged in the ignition circuit, a contact carried by said rotatable member adapted to bridge said spaced contacts when the rotatable member is in one position and to break the ignition circuit when the rotatable member is in another position and means for preventing the removal of said cap.

In testimony whereof I affix my signature in presence of two witnesses.

JAMES R. ADAMS.

Witnesses:
 MAE G. ZERBEE,
 ROY B. SMITH.